Patented Mar. 11, 1930

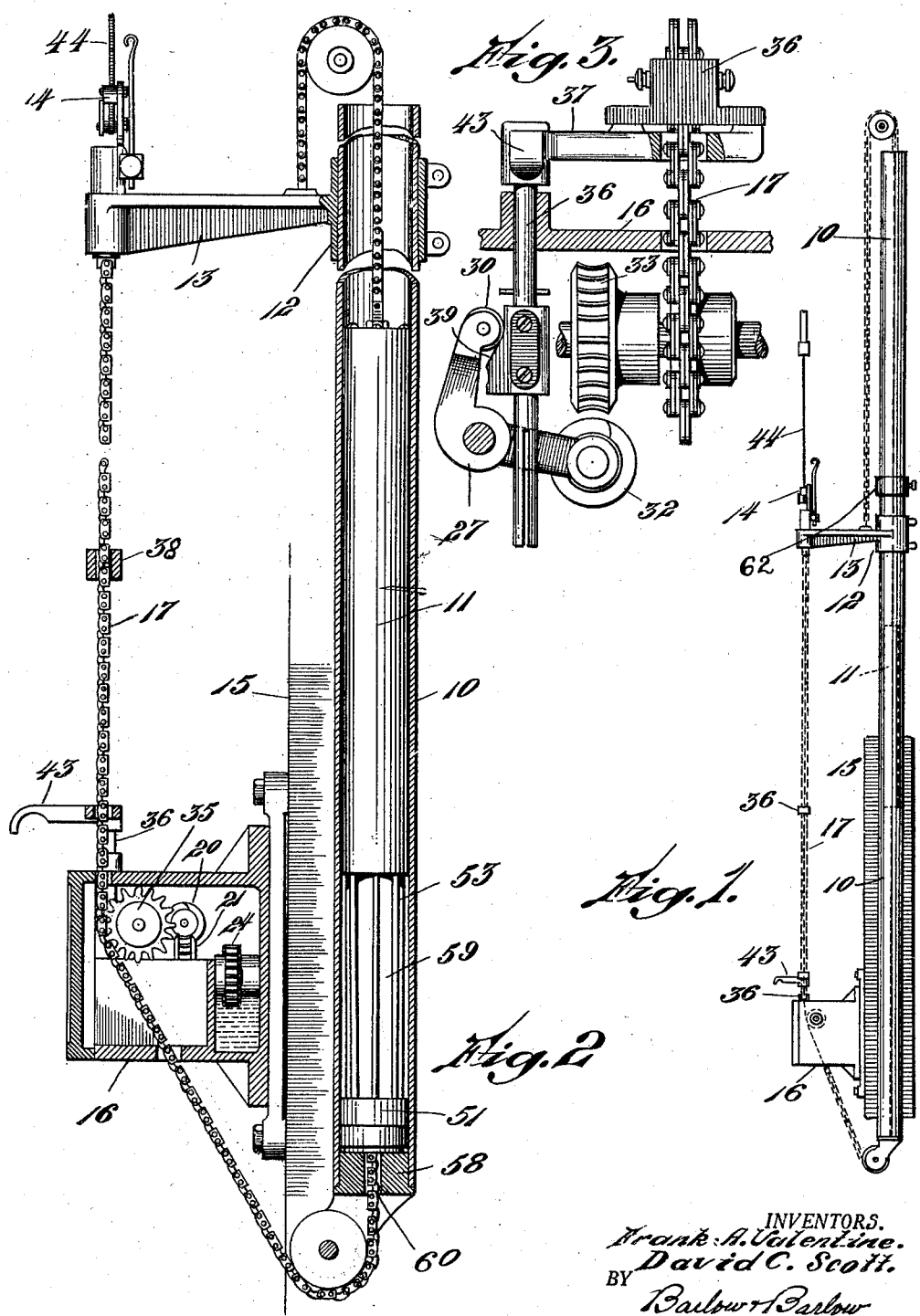

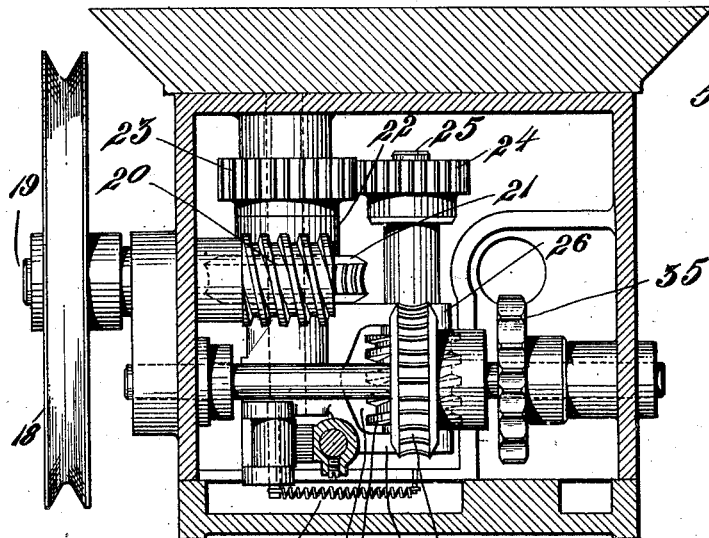
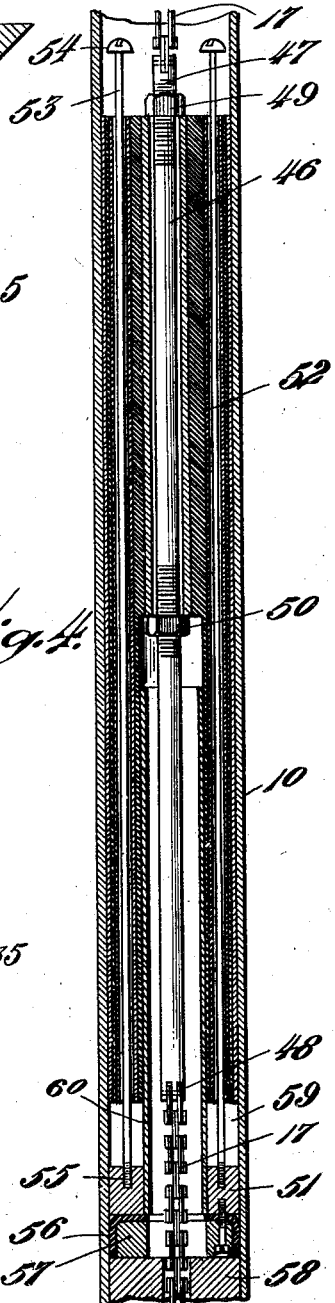
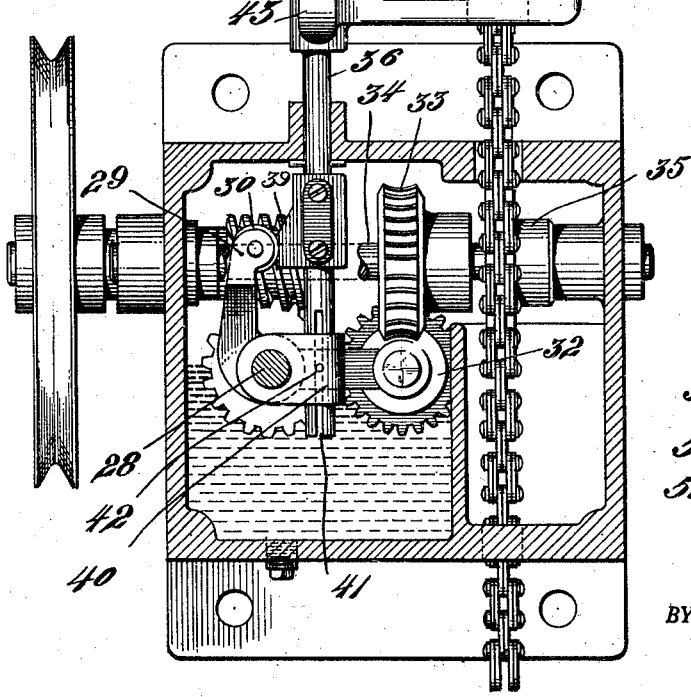

1,749,991

UNITED STATES PATENT OFFICE

FRANK A. VALENTINE, OF APPONAUG, AND DAVID C. SCOTT, OF PROVIDENCE, RHODE ISLAND, ASSIGNORS TO HENRY L. SCOTT COMPANY, OF PROVIDENCE, RHODE ISLAND, A CORPORATION OF RHODE ISLAND

TESTING MACHINE

Application filed October 22, 1926. Serial No. 143,373.

This invention relates to an improvement in testing machines employed for obtaining the strength or stretch of materials such as fabric, rubber or other material; and has for its object to provide mechanism of this character which is positive in its tension applying action and which movement will be automatically arrested upon reaching the end of its tension stroke and a quick return of the parts effected after each testing operation.

A further object of the invention is the provision of a flexible unit which is connected to the work clamp and by which the clamp is operated through driving mechanism for applying a testing pull to the work, means being provided for acting upon this flexible unit to return the clamp after each testing operation.

A still further object of the invention is to arrange the flexible unit in a continuous band form and a weight attached to one part of the flexible unit to return the clamp by gravity when released by the pulling mechanism.

A still further object of the invention is to so construct the return weight that it will act to quickly return the clamp to its starting position and to arrange a dash pot action which will cause the weight to come gradually to rest without shock or jar.

With these and other objects in view, the invention consists of certain novel features of construction, as will be more fully described, and particularly pointed out in the appended claims.

In the accompanying drawings:

Figure 1 is a side elevation showing a portion of our improved testing unit arranged to be operated through a continuous chain or flexible unit.

Figure 2 is an enlarged view partly in section showing the driving mechanism for the flexible unit and the weight and cushioning element therein.

Figure 3 is a side view partly in section showing the tripping mechanism for releasing the driving mechanism from the pull mechanism.

Figure 4 is an enlarged view showing the weight in section.

Figure 5 is a top view showing the gear box in section with the gear driving mechanism mounted therein.

Figure 6 is a view of the gear box partly in section showing the arrangement of gearing therein and the oil well in the box.

It is found in the practical construction and operation of testing machines of this character especially where a long, testing stroke is required, to be of advantage to employ a continuous flexible element such as a sprocket chain, belt or the like and to connect this chain to the work clamp in such a way as to be substantially continuous so that through it the clamp may receive its working stroke and also may be returned to starting position after each testing operation. Also, it is found of advantage to connect a weight onto one of the parts of this unit to effect the return of the clamp by gravity after each testing operation.

Heretofore, where such a continuous chain was not employed, it was found necessary to cut a hole through the floor beneath the machine to permit the end of the chain or weight attached thereto to pass down therethrough into the room below, but by arranging the chain or flexible unit to act like a continuous band and to which both the weight and the clamp are connected, it will be seen that this difficulty is avoided and the machine may be much more compact and take up the minimum operating space.

It is also found to be of advantage to provide a special form of weight so that the same will provide its own dash pot and so cushion its drop at the lower end of its stroke; also it is found in some instances of advantage to provide a tubular standard for carrying the weight and to construct this tubing so as to form a supporting column for the machine, if desired; and the following is a detailed description of the present embodiment of our invention and showing one arrangement of parts by which these advantageous results may be accomplished:—

With reference to the drawings, 10 designates a tubular column in which the return weight 11 is mounted to slide vertically and this column may if desired serve as a support or standard for the machine whether it is attached to a wall or supported from a suitable base on the floor.

Slidably mounted on this tubular standard is a sleeve 12 to which is connected a laterally-extending arm 13 arranged to serve as a support for the work clamp 14. On the framework 15 of the machine we support a gear box 16 in which is mounted the power applying mechanism which is arranged to exert a tension pull through the continuous flexible element or sprocket chain 17. This power applying mechanism is similar to that described in our copending application of even date herewith and consists essentially of a pulley 18 driven preferably from an electric motor (not shown). From this pulley power is transmitted through the shaft 19 to the worm 20 inside the casing.

This worm is arranged to mesh with worm gear 21 which is mounted on the sleeve 22, to the inner end of which is connected a spur gear 23 through which motion is imparted to the corresponding gear 24 on the shaft 25 and this shaft is rotatably mounted in the bearings 26 of the forked rocker bracket 27 to swing with the bracket, which bracket is mounted to swing on the fixed shaft 28 and is provided with an upwardly-extending arm 29 having a worm 30 to engage a cam, presently described.

In the space 31 of this rocker bracket and on the shaft 25 mounted in the bearings in the bracket on either side of this space is mounted a worm 32 to be swung by a rocking movement of the bracket into and out of engagement with the worm gear 33, which latter gear is fixed on the shaft 34 and on this shaft is also fixed a sprocket gear 35, which meshes with the links of the continuous or band-like chain or flexible unit 17 for the purpose of exerting tension pull through this chain upon the work.

In order to automatically disconnect this driving mechanism from the pulling mechanism, we have provided a vertically disposed push rod 36 which extends down into the gear box 16. On the upper end of this rod is a presser arm 37 which extends laterally into position to be engaged by the dog 38, adjustably attached to the chain 17, when the work clamp has reached the end of its pulling stroke. On this push rod within the casing, we have mounted a cam 39, the working face of which is engaged by the roller 30 on the rocker bracket 27, the lower end of this push rod being slidably mounted in bearings 40 and slotted as at 41 to receive the guide pin 42 whereby the rod is prevented from rotating and is caused to hold the cam 39 and its contact arm 37 in proper operating alignment, the latter to be engaged by the downward movement of this dog 38.

On this push rod 37, we have also mounted a finger lever 43 by which the rod may be lifted manually after having been pressed down by the dog, which upward movement of this rod serves to cause the roll-carrying bracket arm to move outwardly on the cam 39 and swing the worm 32 back into engagement with the drive worm gear 33 to start another pulling operation of the rack on the work 44.

In order to obtain the desired result, we have constructed a specially formed weight member which is that of a tube filled with lead and through the center of this tube is passed a bolt 46 to the upper end of which, one end 47 of the chain 17 is connected, and to its lower end, the opposite end 48 of the chain 17 is connected, to lead down through the small hole 60 in the closure plate 58 in which the chain loosely fits.

This bolt is provided with binding nuts 49 and 50 for gripping the central tube portion of the weight between them.

It is found in the use of a continuous or band form of chain of this character difficult to provide a suitable dash pot for cushioning the fall of this weight. Therefore, we have formed the weight in two parts, the lower portion 51 being loosely secured to the upper portion 52 by means of long bolts or rods 53, which rods have a head 54 on their upper ends and are threaded at 55 at their lower ends into the lower member 51 so that a considerable lost motion is provided between the upper and lower parts of the weight. The lower member of the weight is provided with the usual cup packing 56 into which is set a collar 57, the lower edge of which extends below that of the leather packing to protect the edge of the packing against injury when the weight falls against the closure member 58. The action of the weight is that when the power mechanism is applied to pull downward the work clamp the upper portion 52 of the weight is first lifted into the position best illustrated in Figure 2, that is some considerable distance before the lower portion 51 starts to lift, then when this power stroke is drawing to its end, the collar or dog 38 on the chain 17 is caused to engage the tripper rod 36 to disconnect the driving mechanism from the pulling mechanism, the chain thus being released the weight 11 starts to fall. The lower portion 51 of the weight particularly when the clamp is permitted to return to its highest position, first brings up against the bottom portion 58 of the tube which serves to trap a portion of the air in the space 59 between the inner tube 60 and the outer tube 10, which inner tube loosely fits and extends up a considerable distance into the central portion of the weight, thus forming a chamber into which the air is trapped to assist the air trapped between the bottom weight and plug 58 to serve as a cushion to gradually bring the weight to rest and prevent injury to the parts, which dropping movement of the weight serves to return the clamp to its starting position.

In some instances, when work specimens are being tested which are longer than those of the minimum length, we have slidably mounted a stop collar 62 on the column 10 to arrest the return motion of the clamp 14 in position to accommodate this longer length of work and in this case of course the weight may not be permitted to drop directly into engagement with the tube plug 58.

It is found in practice that even under these conditions a double weight of the construction shown will nicely cushion itself owing to the fact that the lower member is first cushioned on the air trapped between it and the plug 58 as the air escapes but slowly through the chain opening 60 in the plug and therefore the heavier upper weight portion which falls faster is cushioned on the dash pot formed between it and the lower part thus performing an adequate cushioning action for the weight even though the bottom part thereof is not permitted to reach the tube stop plug 58.

In other words, when it is desired to start a pulling action through the chain 17 on the work clamp 14, it is only necessary to lift the push rod 36 through the finger lever 43 which causes the driven worm 32 to move into mesh with worm gear 33 which in turn operates the sprocket gear 35 to move the work clamp downwardly to exert tension upon the work, and at the end of its down stroke the dog again engages and pushes the push rod and the bracket arm under action of its spring 45 swings inwardly which serves to withdraw the worm 32 from its worm gear to disengage the power mechanism from the rest of the mechanism and permits the weight 11 to drop and acting through the chain the arm 13 with its work clamp is quickly returned to its starting position.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. In a testing machine, a work clamp comprising two work engaging jaws, driving mechanism, a pull member interposed between one clamp jaw and said driving mechanism and through which power is applied upon the clamp and work, and mechanism independent of the driving mechanism for moving the pulled clamp jaw towards the other clamp jaw after completion of a pulling operation.

2. In a testing machine, a work clamp, power applying mechanism, a pull member interposed between said clamp and power applying mechanism and through which power is applied to the clamp and work, means for automatically stopping the action of the pulling mechanism upon the work at the end of each pulling stroke, and means independent of the driving mechanism for quickly returning the clamp after each pulling operation.

3. In a testing machine, a work clamp, power applying mechanism, a continuous unit including a flexible pull member interposed between said clamp and power mechanism through which power is applied to the clamp and work, and means to which the opposite ends of said flexible member is attached for taking up the slack of said flexible member.

4. In a testing machine, a work clamp, power applying mechanism, a flexible pull member operatively connected to said clamp and arranged to be engaged by said power applying mechanism to exert tension upon the clamp and work, a tripper mechanism, a stop on said flexible member arranged to engage said tripper to arrest the action of said power applying mechanism upon reaching the end of its working stroke, and means independent of said power applying mechanism acting through said flexible member for returning the work clamp rapidly to its starting position.

5. In a testing machine, a work clamp, a clamp carrying member, a continuous flexible band having its opposite ends operatively connected to said clamp member, and means for imparting motion to said band to impart a working stroke and a return stroke to said clamp.

6. In a testing machine, a work clamp, a clamp carrying member, a continuous unit having both ends connected to said clamp member, and means for applying power to said unit to exert a tension through the clamp on the work and also to return the clamp after each working stroke.

7. In a testing machine, a work clamp, driving mechanism, a continuous unit having flexible portions and operatively connected at both ends to said clamp and driving mechanism and through which power is applied to said clamp through said unit.

8. In a testing machine, a work clamp, driving mechanism, a continuous unit operatively connected at both ends to said clamp and driving mechanism and through which power is applied to said clamp, and means acting through said unit to return said clamp after each working stroke.

9. In a testing machine, a work clamp, a continuous unit having flexible portions and having both ends operatively connected to said clamp, driving mechanism arranged to apply pulling power to said clamp through said unit, and a weight acting on said unit to return the clamp after its working stroke.

10. In a testing machine, a work clamp, a continuous sprocket chain operatively connected to said clamp, a power driven sprocket gear in engagement with the chain through which tension is applied to the work, means for rendering inoperative said gear, and means acting through said chain for returning said clamp after a working stroke.

11. In a testing machine, a work clamp, a continuous flexible unit operatively connected to said clamp, driving mechanism arranged to apply pulling power to said clamp through said unit, a weight acting on said unit to return the clamp after its working stroke, and means for cushioning the drop of the weight.

12. In a testing machine, a work clamp, a continuous flexible unit operatively connected to said clamp driving mechanism arranged to apply pulling power to said clamp through said unit, a weight acting on said unit, a tubular standard, a weight slidable in said standard and arranged to act upon said unit to return the clamp after its working stroke, and means for cushioning the drop of said weight in its standard.

13. In a testing machine, a work clamp, a continuous flexible unit operatively connected to said clamp, driving mechanism arranged to apply pulling power to said clamp through said unit, a weight acting on said unit to return the clamp after its working stroke, said weight having two separate interengaging portions arranged to cooperate one with the other to cushion its drop.

In testimony whereof we affix our signatures.

FRANK A. VALENTINE.
DAVID C. SCOTT.